United States Patent
Yamamoto et al.

(10) Patent No.: US 9,207,444 B2
(45) Date of Patent: Dec. 8, 2015

(54) FOCUSING DEVICE, FOCUSING METHOD, FOCUSING PROGRAM AND MICROSCOPE

(75) Inventors: Takashi Yamamoto, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 842 days.

(21) Appl. No.: 13/502,495

(22) PCT Filed: Sep. 21, 2010

(86) PCT No.: PCT/JP2010/005713
§ 371 (c)(1),
(2), (4) Date: Apr. 17, 2012

(87) PCT Pub. No.: WO2011/048749
PCT Pub. Date: Apr. 28, 2011

(65) Prior Publication Data
US 2012/0206590 A1 Aug. 16, 2012

(30) Foreign Application Priority Data
Oct. 23, 2009 (JP) ................................. 2009-244735

(51) Int. Cl.
*G02B 21/14* (2006.01)
*G02B 7/28* (2006.01)
*G02B 7/34* (2006.01)
*G02B 21/24* (2006.01)

(52) U.S. Cl.
CPC *G02B 21/14* (2013.01); *G02B 7/28* (2013.01); *G02B 7/34* (2013.01); *G02B 21/241* (2013.01)

(58) Field of Classification Search
None
See application file for complete search history.

(56) References Cited

U.S. PATENT DOCUMENTS

| 4,186,301 | A | * | 1/1980 | Basire et al. | 250/204 |
| 4,500,189 | A | | 2/1985 | Aoki | |
| 6,384,872 | B1 | * | 5/2002 | Tsui et al. | 348/625 |
| 6,570,156 | B1 | | 5/2003 | Tsuneta et al. | |
| 2004/0061914 | A1 | | 4/2004 | Miyawaki et al. | |
| 2004/0257331 | A1 | * | 12/2004 | Yoshino | 345/156 |
| 2009/0201499 | A1 | * | 8/2009 | Monk et al. | 356/310 |
| 2009/0213214 | A1 | | 8/2009 | Yamada | |
| 2010/0060729 | A1 | * | 3/2010 | Wetzel et al. | 348/79 |
| 2011/0115897 | A1 | * | 5/2011 | Najmabadi et al. | 348/79 |

FOREIGN PATENT DOCUMENTS

| GB | 1 517 648 | 7/1978 |
| JP | 07-281080 | 10/1995 |
| JP | 2004-109348 | 4/2004 |
| JP | 2008-268815 | 11/2008 |
| JP | 61-055618 | 7/2009 |

(Continued)

OTHER PUBLICATIONS

U.S. Appl. No. 61/144,125, filed Jan. 2009, Yang.*

(Continued)

*Primary Examiner* — Frederick Bailey
(74) *Attorney, Agent, or Firm* — K&L Gates LLP (57) ABSTRACT

In one example embodiment, a focusing device generates a first image associated with a sample having a first irregularity. The focusing device determines a second irregularity based on the generated first image. In this embodiment, the determined second irregularity corresponds to the first irregularity. For a lens, the focusing device determines a focusing position based on the determined second irregularity.

20 Claims, 8 Drawing Sheets

CONFIGURATION OF MICROSCOPE

(56) References Cited

FOREIGN PATENT DOCUMENTS

| | | |
|---|---|---|
| JP | 2009-162847 | 7/2009 |
| JP | 2009-163155 | 7/2009 |
| JP | 2009-175334 | 8/2009 |
| WO | 02/39059 | 5/2002 |

OTHER PUBLICATIONS

Japanese Patent Office, Office Action issued in connection with Japanese Patent Application No. 2009-244735, dated Aug. 6, 2013. (4 pages).

European Patent Office, Extended European Search Report issued in connection with European Patent Application No. 10824604.2, dated Feb. 7, 2013. (5 pages).

Intellectual Property Office of Singapore, Written Opinion & Search Report issued in connection with Singapore Patent Application No. 201202291-9, dated Jan. 21, 2013. (114 pages).

Office Action issued in connection with Japanese Patent Application No. 2009-244735, dated Apr. 15, 2014. (5 pages).

The State Intellectual Property Office of the People' Republic of China, Notification of the Second Office Action issued in connection with P.R.C. Patent Application No. 201080046730.5, dated Jun. 17, 2014. (16 pages).

\* cited by examiner

FIG.2

SUBJECT IMAGE AND PHASE CONTRAST IMAGES OF TISSUE SECTION

DISPARITY FOR EACH PIXEL BETWEEN ONE IMAGE
AND ANOTHER IMAGE OF PHASE CONTRAST IMAGES

FIG.5A

DETERMINATION OF FOCAL POSITION IN PLANAR PORTION AND INCLINED PORTION(A)

FIG.5B

DETERMINATION OF FOCAL POSITION IN PLANAR PORTION AND INCLINED PORTION(B)

FIG.6

DETERMINATION OF PLURAL FOCAL POSITIONS ACCORDING
TO DEPTH OF FIELD OF OBJECT LENS

FIG.7

FOCUSING POSITION DETERMINATION PROCEDURE

FIG.8

CHANGE OF DEPTH OF FIELD

FIG.9

EXAMPLE OF DIVIDING IMAGING AREA IN ANOTHER EMBODIMENT

FOCUSING DEVICE, FOCUSING METHOD, FOCUSING PROGRAM AND MICROSCOPE

CROSS REFERENCES TO RELATED APPLICATIONS

The present application is a National Stage of International Application No. PCT/JP2010/005713 filed on Sep. 21, 2010 and which claims priority to Japanese Patent Application No. 2009-244735 filed on Oct. 23, 2009, the entire contents of which are being incorporated herein by reference.

BACKGROUND

In a pathological diagnosis, a tissue section is fixed to a glass slide and a preparation is fabricated through a staining process and a sealing process. In general, when a storage term of the preparation becomes long, visibility of the preparation with the microscope deteriorates due to deterioration and color failure of a biological sample. Although there is a case in which a microscopic examination is performed to the preparation in facilities other than the facilities such as a hospital at which this is fabricated, the preparation is delivered by post in general and it takes a certain time.

In view of such circumstances, a device of saving the biological sample as image data is proposed (for example, refer to Japanese Patent Application Laid-Open No. 2009-175334). In this device, focusing technology to focus on the biological sample based on contrast of the imaged image is adopted.

The biological sample has a thickness. Therefore, in the above focusing technique, a process to shift a focal point at predetermined intervals in a depth direction of the biological sample, thereby searching an optimal focal position based on the contrast of the imaged image at the focal points is necessary.

For example, when the thickness of the biological sample on the preparation is 10 µm and a depth of field of an optical lens to condense light at the biological sample is 1 µm, a process to search the optimal focal position from approximately 50 imaged images is necessary.

This takes considerable time until focusing, and efficiency of obtaining the biological sample as the image data significantly lowers.

In light of the foregoing, it is desirable to propose the focusing device, the focusing method, the focusing program and the microscope capable of improving the efficiency of obtaining a subject image.

The distance for each pixel between one image and the other image of the phase contrast images corresponds to information indicating irregularity of an imaging area (area appearing on the image forming surface of the object lens). Since the depths of field of the separator lenses are made larger than that of the object lens by the openings in the present disclosure, detailed irregularity of the subject may be recognized before focusing from the phase contrast images. Furthermore, the detailed irregularity of the subject may be recognized before focusing and by one imaging.

Therefore, it is possible to appropriately determine the focusing position at which an entire subject appearing on the image forming surface of the object lens becomes sharp and the number thereof in consideration of the irregularity of the subject and the area according to the depth of field of the object lens in the present disclosure.

As a result, the focal position may be determined at high speed and without loss according to the subject in the imaging area as compared to a method of imaging while shifting the focal point at predetermined intervals in the depth direction of the tissue section and searching the focal position based on the contrast of the imaged image. Therefore, the focusing device, the focusing method, the focusing program and the microscope capable of improving the efficiency of obtaining the subject image may be realized.

SUMMARY

The present disclosure relates to a focusing device, a focusing method, a focusing program and a microscope, and is suitable when observing a tissue section, for example.

In an example embodiment, a focusing device includes a processor and a memory device operatively coupled to the processor, the memory device storing instructions that cause the processor, in cooperation with the memory device, to: (a) generate a first image associated with a sample (e.g., a section of biological tissue) having a first irregularity; (b) determine a second irregularity based on the generated first image, the determined second irregularity corresponding to the first irregularity; and (c) for a lens, determine a focusing position based on the determined second irregularity.

In an example embodiment, at the determined focusing position, an image of the sample becomes sharp, wherein the image of the sample is different from the generated first image.

In an example embodiment, the instructions cause the processor to determine positions of the sample, wherein the positions correspond to the second irregularity.

In an example embodiment, the instructions cause the processor to generate the first image based on a phase-contrast image.

In an example embodiment, the method of operating a focusing device including instructions includes: (a) causing a processor to execute the instructions to generate a first image associated with a sample (e.g., a section of biological tissue) having a first irregularity; (b) causing the processor to execute the instructions to determine a second irregularity based on the generated first image the determined second irregularity corresponding to the first irregularity; and (c) causing the processor to execute the instructions to, for a lens, determine a focusing position based on the determined second irregularity.

In an example embodiment, at the determined focusing position, an image of the sample becomes sharp, the image of the sample being different from the generated first image.

In an example embodiment, the method includes causing the processor to execute the instructions to determine positions of the sample, the positions corresponding to the second irregularity.

In an example embodiment, the method includes causing the processor to execute the instructions to generate the first image based on a phase-contrast image.

In an example embodiment, the method includes causing the processor to execute the instructions to determine the focusing position based on an area of the generated first image, the area being associated with adjacent pixels having disparities smaller than a threshold value.

In an example embodiment, the computer-readable medium stores instructions structured to cause a focusing device to: (a) generate an image associated with a sample having a first irregularity; (b) determine a second irregularity based on the generated image, the determined second irregularity corresponding to the first irregularity; and (c) for a lens, determine a focusing position based on the determined second irregularity.

In an example embodiment, the focusing device includes a processor and a memory device operatively coupled to the processor, the memory device storing instructions that cause the processor, in cooperation with the memory device, to: (a) generate a first image associated with a sample and a second image associated with the sample; (b) determine disparities between: (i) the second image associated with the sample; and (ii) the third image associated with the sample; and (c) for a lens, determine a focusing position based on the determined disparities.

In an example embodiment, the instructions cause the processor to: (a) determine a value corresponding to a difference between a maximum value of disparity and a minimum value of disparity; (b) in response to the value being larger than a predetermined threshold, for the lens, divide an imaging area into a plurality of layers; and (c) for each of the layers, determine a separate focusing position.

In an example embodiment, the instructions cause the processor to determine a number of the plurality of layers based on a depth of field of the lens.

In an example embodiment, the instructions cause the processor to: (a) determine a value corresponding to a difference between a maximum value of disparity and a minimum value of disparity; (b) in response to the value being larger than a predetermined threshold, for the lens, divide an imaging area into a first layer, a second layer and a third layer; (c) for each of the first layer and the second layer, determine a separate focusing position; and (d) for the third layer, eliminate a determination of a focusing position. In an example embodiment, the third layer corresponds to a portion which does not include a section of the sample.

In an example embodiment, the lens has a first depth of field which corresponds to a maximum depth of field, wherein a first value corresponds to the first depth of field. In an example embodiment, the lens is set at a second depth of field, wherein a second value corresponds to the second depth of field. In an example embodiment, the instructions cause the processor to: (i) determine a third value which corresponds to a difference between a maximum value of disparity and a minimum value of disparity; (ii) in response to the third value being: (A) smaller than the first value; and (B) larger than the second value, set the lens at a third depth of field, the third depth of field being larger than the second depth of field.

In an example embodiment, the instructions cause the processor to determine the focusing position based on an area of the generated first image, the area being associated with adjacent pixels having disparities smaller than a threshold value.

In an example embodiment, the method of operating a focusing device including instructions includes (a) causing a processor to execute the instructions to generate a first image associated with a sample and a second image associated with the sample; (b) causing the processor to execute the instructions to determine disparities between: (i) the second image associated with the sample; and (ii) the third image associated with the sample; and (c) causing the processor to execute the instructions to for a lens, determine a focusing position based on the determined disparities.

In an example embodiment, the method includes: (a) causing the processor to execute the instructions to determine a value corresponding to a difference between a maximum value of disparity and a minimum value of disparity; (b) causing the processor to execute the instructions to, in response to the value being larger than a predetermined threshold, for the lens, divide an imaging area into a plurality of layers; and (c) causing the processor to execute the instructions to, for each of the layers, determine a separate focusing position.

In an example embodiment, the method includes: (a) causing the processor to execute the instructions to determine a value corresponding to a difference between a maximum value of disparity and a minimum value of disparity; (b) causing the processor to execute the instructions to, in response to the value being larger than a predetermined threshold, for the lens, divide an imaging area into a first layer, a second layer and a third layer; (c) causing the processor to execute the instructions to, for each of the first layer and the second layer, determine a separate focusing position; and (d) causing the processor to execute the instructions to, for the third layer, eliminate determining a focusing position. In an example embodiment, the third layer includes a portion which does not include a section of the sample.

In an example embodiment, the lens has a first depth of field which corresponds to a maximum depth of field, wherein a first value corresponds to the first depth of field. In an example embodiment, the lens is set at a second depth of field, wherein a second value corresponds to the second depth of field.

In an example embodiment, the method includes: (i) causing the processor to execute the instructions to determine a third value which corresponds to a difference between a maximum value of disparity and a minimum value of disparity; and (ii) causing the processor to execute the instructions to, in response to the third value being: (A) smaller than the first value; and (B) larger than the second value, set the lens at a third depth of field, the third depth of field being larger than the second depth of field.

In an example embodiment, the microscope includes: a stage configured to support a sample (e.g., a section of biological tissue) having a first irregularity; a lens configured to form a first image associated with the sample; a processor; and a memory device operatively coupled to the processor, the memory device storing instructions that cause the processor, in cooperation with the stage, the lens and the memory device, to: (a) generate a second image associated with the sample; (b) determine a second irregularity based on the generated second image, the determined irregularity corresponding to the first irregularity; and (c) for a lens, determine a focusing position based on the determined second irregularity.

In an example embodiment, at the determined focusing position, the formed image associated with the sample becomes sharp.

In an example embodiment, the microscope includes a stage driving mechanism configured to drive the stage based on the determined focusing position.

In an example embodiment, the microscope includes an imaging device operatively coupled to the processor, the imaging device being configured to obtain the first image associated with sample.

In an example embodiment, the microscope includes: (a) a first separator lens having a first depth; (b) a second separator lens having a second depth; and (c) an aperture mask having a first opening and a second opening.

In an example embodiment, the microscope adjusts the size of the first opening and the second opening such that the first depth of the first separator lens and the second depth of the second separator lens are larger than a depth of the lens configured to form the image associated with the biological sample.

In an example embodiment, the microscope determines positions of the sample, the positions corresponding to the determined second irregularity.

In an example embodiment, the microscope determines disparities between images associated with the sample, the images associated with the sample being different from the first image and the second image, the disparities corresponding to the determined second irregularity.

In an example embodiment, the microscope determines a value corresponding to a difference between a maximum value of disparity and a minimum value of disparity. In this example embodiment, in response to the value being larger than a predetermined threshold, for the lens, the microscope divides an imaging area into a plurality of layers, and for each of the layers, determines a separate focusing position.

In an example embodiment, the microscope determines a value corresponding to a difference between a maximum value of disparity and a minimum value of disparity. In this example embodiment, the microscope, in response to the value being larger than a predetermined threshold, for the lens, divides an imaging area into a first layer, a second layer and a third layer, and for each of the first layer and the second layer, determine a separate focusing position. In an example embodiment, for the third layer, the microscope eliminates determining a focusing position. In an example embodiment, the third layer includes a portion which does not include a section of the sample.

In an example embodiment, the lens has a first depth of field which corresponds to a maximum depth of field, wherein a first value corresponds to the first depth of field. In this example embodiment, the lens is set at a second depth of field, wherein a second value corresponds to the second depth of field. In this example, embodiment, the microscope determines a third value which corresponds to a difference between a maximum value of disparity and a minimum value of disparity. In response to the third value being: (A) smaller than the first value; and (B) larger than the second value, the microscope sets the lens at a third depth of field, the third depth of field being larger than the second depth of field.

In an example embodiment, the method of operating a microscope including instructions includes (a) providing a stage configured to support a sample having a first irregularity; (b) providing a lens configured to form a first image associated with the sample; (c) causing a processor to execute the instructions to generate a second image associated with the sample; (d) causing the processor to execute the instructions to determine a second irregularity based on the generated second image, the determined irregularity corresponding to the first irregularity; and (e) for a lens, causing the processor to execute the instructions to determine a focusing position based on the determined second irregularity.

In an example embodiment, the focusing device includes a processor, and a memory device operatively coupled to the processor, the memory device storing instructions that cause the processor, in cooperation with the memory device, to: (a) generate a first image associated with a sample, the first image having a first plurality of pixels; (b) generate a second image associated with the sample, the second image having a second plurality of pixels which correspond to the first plurality of pixels; (c) determine a plurality of disparities between the first plurality of pixels and the second plurality of pixels; and (d) for a lens, determine a focusing position based on the determined plurality of disparities.

Additional features and advantages are described herein, and will be apparent from the following Detailed Description and the figures.

DETAILED DESCRIPTION

An example embodiment for carrying out the disclosure is hereinafter described. It will be described in the following order.
1. Example Embodiment
   1-1. Configuration of Microscope
   1-2. Configuration of Focusing Device
   1-3. Focusing Position Determination Procedure
   1-4. Effect and the Like
2. Another Embodiment 1. Example Embodiment

[1-1. Configuration of Biological Sample Image Obtaining Device]

Figure 1:
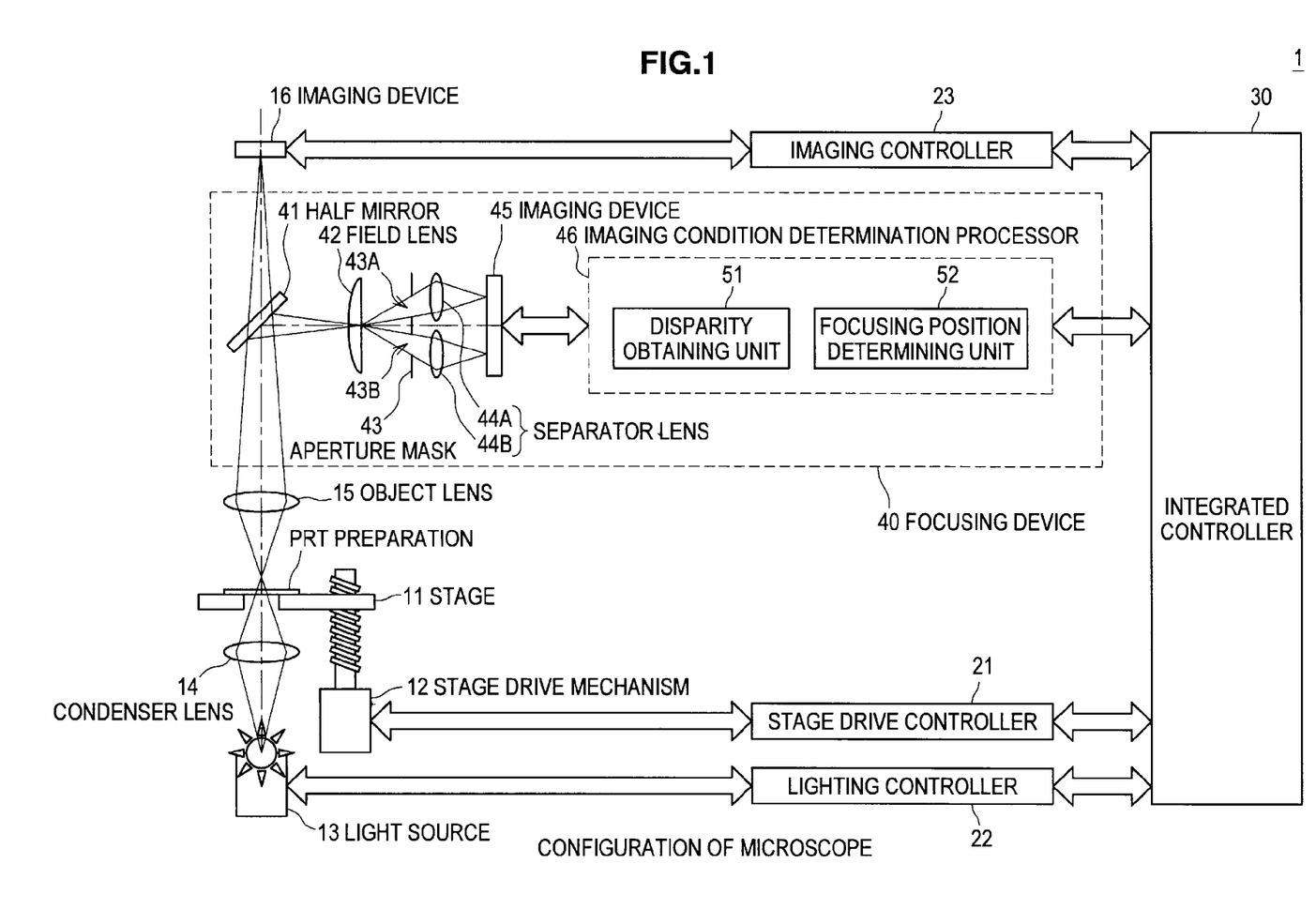
FIG. 1 is a schematic diagram illustrating a configuration of a microscope.

FIG. 1 illustrates a microscope 1 according to one embodiment of the present disclosure. The microscope 1 has a plate-shaped stage 11 on which a preparation PRT is arranged.

The preparation PRT is obtained by fixing a section of tissue such as connective tissue such as blood, epithelial tissue or both of them on a glass slide SG using a predetermined fixing method and sealing the same, and the tissue section is stained where appropriate. Staining includes not only the staining referred to as popular staining as represented by hematoxylin-eosin (HE) staining, Giemsa staining, Papanicolaou staining and the like, but also the staining referred to as special staining such as fluorescence in-situ hybridization (FISH) and immunoenzymatic technique.

A stage drive mechanism 12 is provided in the stage 11. The stage drive mechanism 12 is configured to drive the stage 11 in a direction parallel to a stage surface (X-Y axis direction) and in a direction orthogonal thereto (Z-axis direction). In general, an arresting unit (not illustrated) to arrest the preparation PRT at a fixed position is provided on the stage surface on a side on which the preparation PRT is arranged (hereinafter, also referred to as a preparation arranging surface).

A light source 13 is arranged on a side opposite to the preparation arranging surface of the stage 11. The light source 13 is configured to be able to apply light to illuminate the tissue section to which the popular staining is applied (hereinafter, also referred to as bright field illumination light) and light to illuminate the tissue section to which the special staining is applied (hereinafter, also referred to as dark field illumination light) by switching them. However, it is also possible that only one of the bright field illumination light and the dark field illumination light may be applied. A condenser lens 14 of which light axis coincides with a normal to a standard position on the preparation arranging surface is arranged between the light source 13 and the stage 11.

An object lens 15 of which light axis coincides with the normal to the standard position on the stage surface is arranged on the preparation arranging surface side of the stage 11. The object lens 15 is selected by a lens switch mechanism or manually from a plurality of object lenses with different magnification ratios. An imaging device 16 of which imaging surface is a main image forming surface of the object lens 15 is arranged behind the object lens 15.

As control systems of the microscope 1, a stage drive controller 21, a lighting controller 22 and an imaging controller 23 are connected to the stage drive mechanism 12, the light source 13 and the imaging device 16, respectively, through data communication paths.

The control system is a computer including a central processing unit (CPU), a read only memory (ROM), a random access memory (RAM) being a work memory of the CPU, an arithmetic circuit and the like.

The stage drive controller 21 drive-controls the stage drive mechanism 12 to move (scan) the stage 11 in a stage surface direction (X-Y axis direction) such that the tissue section of the preparation PRT is allocated to a light condensing portion at which the light is condensed by the condenser lens 14.

Further, the stage drive controller 21 drive-controls the stage drive mechanism 12 to move the stage 11 in the direction orthogonal to the stage surface (Z-axis direction (that is to say, a depth direction of the tissue section)) such that a part of the tissue section allocated to the light condensing portion is in focus of the object lens 15. The lighting controller 22 sets a parameter corresponding to a mode in which a bright field image should be obtained (hereinafter, also referred to as a bright field mode) or a mode in which a dark field image should be obtained (hereinafter, also referred to as a dark field mode) in the light source 13 and applies the illumination light from the light source 13. The parameter is, for example, strength of the illumination light, selection of a light source type and the like.

Meanwhile, the illumination light in the bright field mode is visual light, in general. On the other hand, the illumination light in the dark field mode is the light including a wavelength to excite a fluorescent marker used in the special staining. Further, a background of the fluorescent marker is cut out in the dark field mode.

When the illumination light is applied from the light source 13, the illumination light is condensed at the standard position on the preparation arranging surface of the stage 11 by the condenser lens 14. An image of the light condensing portion at which the light is condensed by the condenser lens 14 of the tissue section of the preparation PRT is formed in an enlarged manner on the image forming surface of the object lens 15, and the enlarged image is formed as a subject image on the imaging surface of the imaging device 16 by the object lens 15.

The imaging controller 23 sets the parameter corresponding to the bright field mode or the dark field mode in the imaging device 16 and obtains data of the subject image formed on the imaging surface of the imaging device 16. The parameter is, for example, start timing and end timing of an exposure and the like.

Further, there is a controller (hereinafter, also referred to as an integrated controller) 30 to control an entire microscope 1 as the control system of the microscope 1, which is connected to the stage drive controller 21, the lighting controller 22 and the imaging controller 23 through the data communication paths. The integrated controller 30 is the computer including the CPU, the ROM, the RAM, the arithmetic circuit, a storage medium and the like.

The integrated controller 30 waits a start instruction of the bright field mode or the dark field mode, and when receiving the start instruction, this provides an instruction that the control should be started in the mode corresponding to the starting instruction to the stage drive controller 21, the lighting controller 22 and the imaging controller 23.

Further, the integrated controller 30 stores the data of the enlarged image of the tissue section part obtained by the imaging device 16 in the storage medium each time the tissue section part of the preparation PRT is allocated in the stage drive controller 21.

Then, the integrated controller 30 waits a display instruction, and when receiving the display instruction, this reads the data corresponding to the enlarged image specified by the display instruction from the storage medium and provides the same to a source of the display instruction.

In this manner, the microscope 1 is configured to store the tissue section of the preparation PRT as an image of a microscopic examination state, thereby saving information regarding the tissue section for a long period without deterioration of a state of fixing, staining and the like as compared to a case in which the preparation PRT itself is saved.

[1-2. Configuration of Focusing Device]

In addition to such configuration, the microscope 1 is provided with a focusing device 40. The focusing device 40 includes a half mirror 41, a field lens 42, an aperture mask 43, separator lenses 44A and 44B, an imaging device 45 and an imaging condition determination processor 46 as illustrated in FIG. 1.

The half mirror 41 is arranged between the object lens 15 and the imaging device 16 such that a light axis thereof coincides with the normal to the standard position of the stage surface and divides light entering from the object lens 15 into transmitted light and reflected light.

The field lens 42 relays the subject image of the object lens 15 projected on a reflection side, for example, of the half mirror 41 backward (predetermined image forming surface). Subject light reflected by the half mirror 41 is condensed by the field lens 42, so that brightness around the field is inhibited from lowering.

The aperture mask 43 is arranged behind the field lens 42 and has a pair of openings 43A and 43B on a plane orthogonal to a light axis of the field lens 42 at positions symmetrical about the light axis. Sizes of the openings 43A and 43B are adjusted such that depth of fields of the separator lenses 44A and 44B are larger than the depth of field of the object lens 15.

The aperture mask 43 divides a subject light beam entering from the field lens 42 by the openings 43A and 43B. The divided light beams intersect with each other on an image forming surface of the subject light beam to be the light beams of which positional relationship changes back and forth of the image forming surface.

The separator lenses 44A and 44B are separately arranged behind the pair of openings 43A and 43B, respectively. The separator lenses 44A and 44B shift to form images of the divided light beams divided by the corresponding openings 43A and 43B and form a pair of subject images (hereinafter, also referred to as phase contrast images) on the predetermined image forming surface to which the field lens 42 relays.

Meanwhile, when the separator lenses 44A and 44B cause vignetting of the field lens 42, a part of the divided light beams is lost. Therefore, the separator lenses 44A and 44B are arranged closer to a central side of the field lens 42 so as not to cause the vignetting.

The imaging device 45 is not a line sensor but an area sensor of which imaging surface is the predetermined image forming surface of the subject image relayed by the field lens 42.

Figure 2:
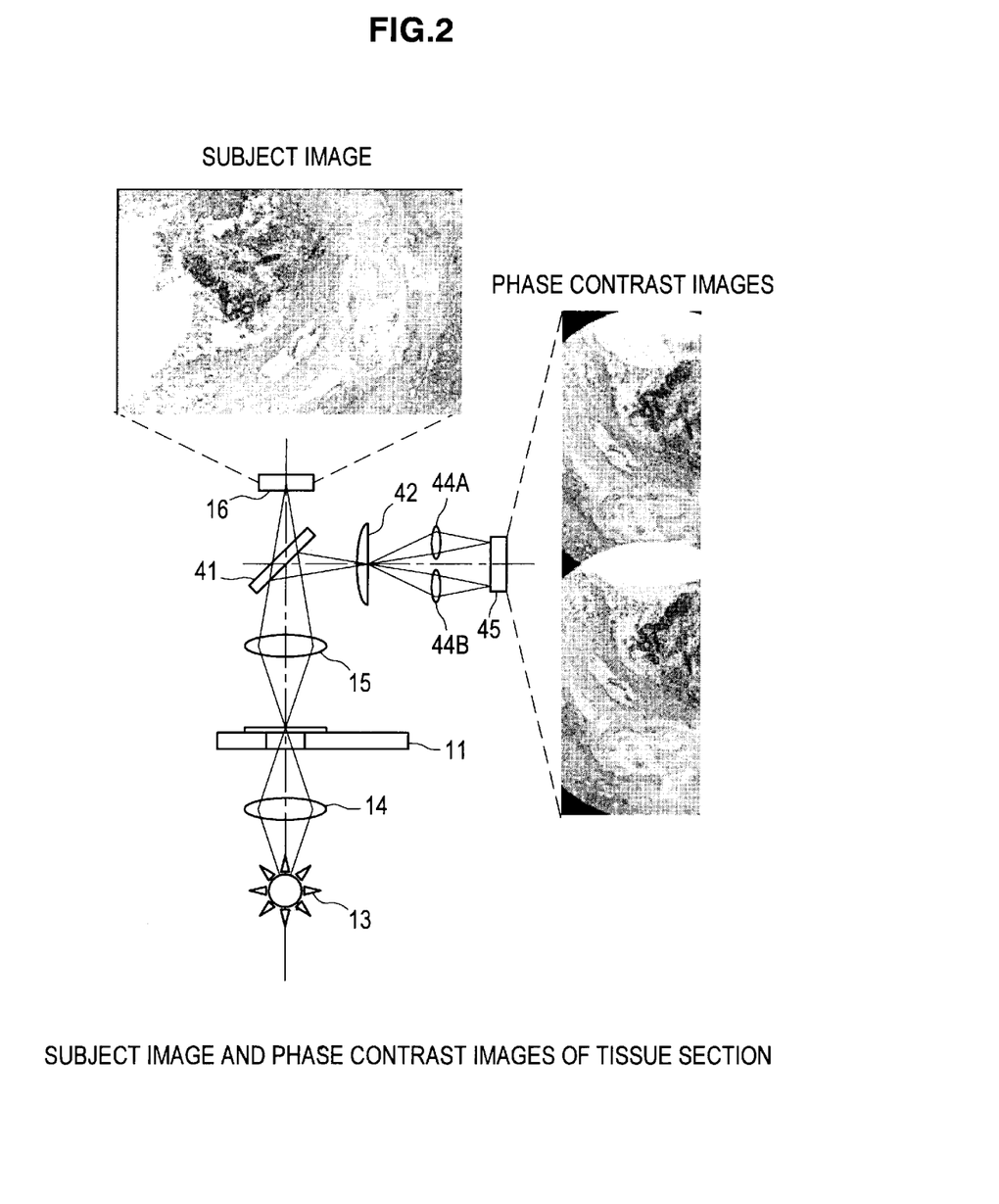
FIG. 2 is a picture illustrating a subject image and phase contrast images of a tissue section.

Herein, FIG. 2 illustrates a picture of the bright field image imaged by the imaging device 16 arranged on the main image forming surface of the object lens 15 and the phase contrast images imaged by the imaging device 45 arranged on the predetermined image forming surface of the object lens 15. As is understood from FIG. 2, the bright field image formed on the imaging surface of the imaging device 16 (main image forming surface) is formed on the imaging surface of the imaging device 45 (predetermined image forming surface) as the phase contrast images by the separator lenses 44A and 44B.

The imaging condition determination processor 46 is the computer including the ROM, the RAM, the arithmetic circuit and the like for the CPU in which the ROM stores a program for determining an imaging condition (hereinafter, also referred to as an imaging condition determination program).

When an instruction that the imaging condition should be determined is provided by the integrated controller 30, the imaging condition determination processor 46 serves as a disparity obtaining unit 51 and a focusing position determining unit 52 as illustrated in FIG. 1, according to the imaging condition determination program.

The disparity obtaining unit 51 sequentially selects each pixel in one image, which should be a standard, of the phase contrast images (hereinafter, also referred to as a standard image) as a pixel, which is an object of interest (hereinafter, referred to as a pixel of interest).

Further, the disparity obtaining unit 51 detects a pixel corresponding to the pixel of interest (hereinafter, referred to as a relative pixel) from the other image, which should be referred to, of the phase contrast images (hereinafter, also referred to as a reference image) each time this selects the pixel of interest to obtain a distance between the pixel of interest and the relative pixel. The distance corresponds to the disparity.

Meanwhile, as a method of detecting a corresponding point, a method of searching a block having a pixel value most similar to that of a block of interest around a point of interest, for example, from the other image of the phase contrast images, which should be referred to, by a normalized correlating method and setting the center of the block the corresponding point is applied.

In this manner, the disparity obtaining unit 51 is configured to obtain the distance (disparity) between the standard image and the reference image in a pixel unit.

Figure 3:
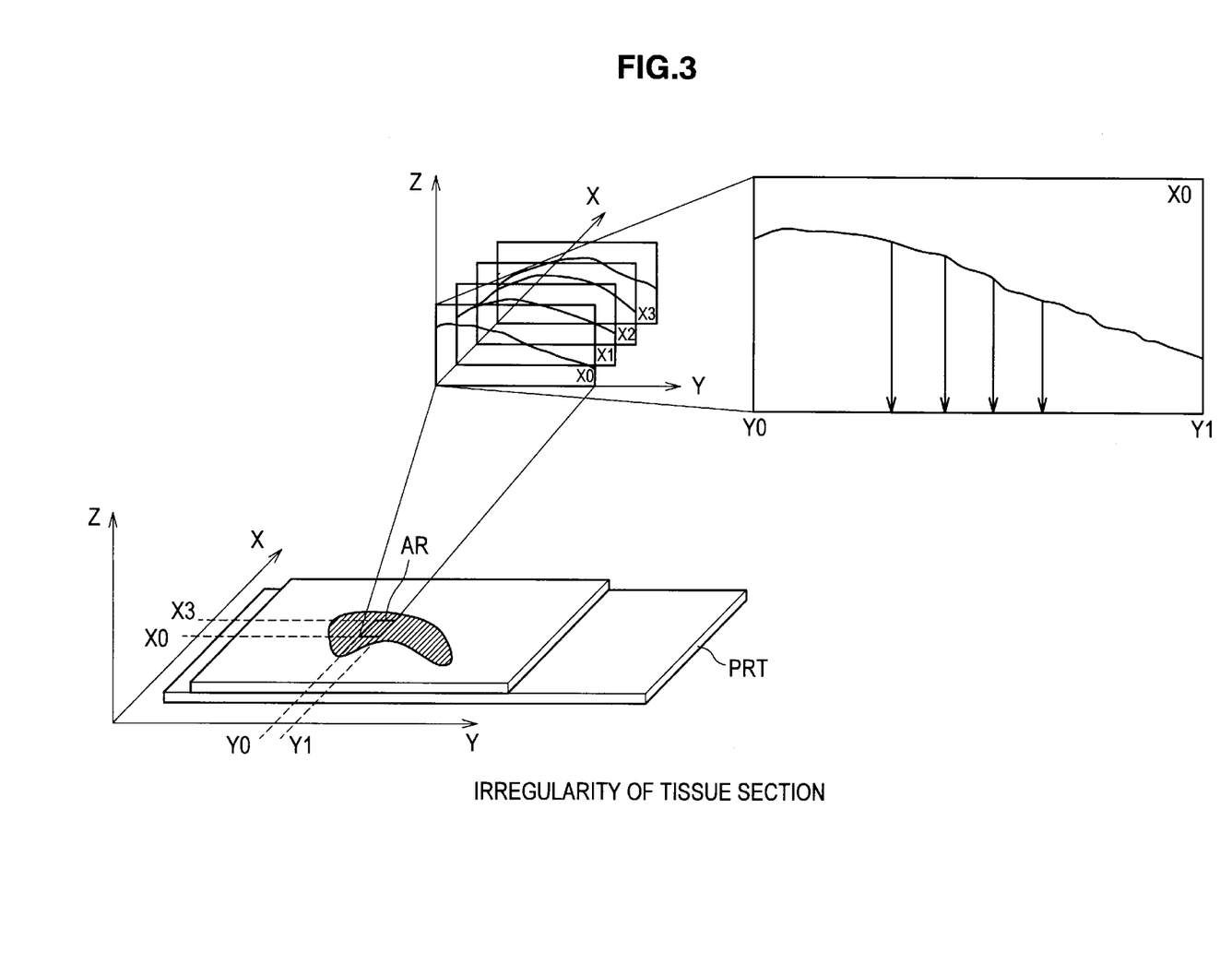
FIG. 3 is a schematic diagram illustrating irregularity of the tissue section.

Relationship is such that the smaller the distance (disparity) is, the further forward a focal point of the object lens 15 is located, and on the other hand, the larger the distance (disparity) is, the further backward the focal point is located. Therefore, the distance between each pixel of the standard image and the relative pixel of the reference image corresponds to information indicating irregularity of an imaging area (area appearing on the image forming surface of the object lens 15) AR of the tissue section of the preparation PRT, as illustrated in FIG. 3.

Figure 4:
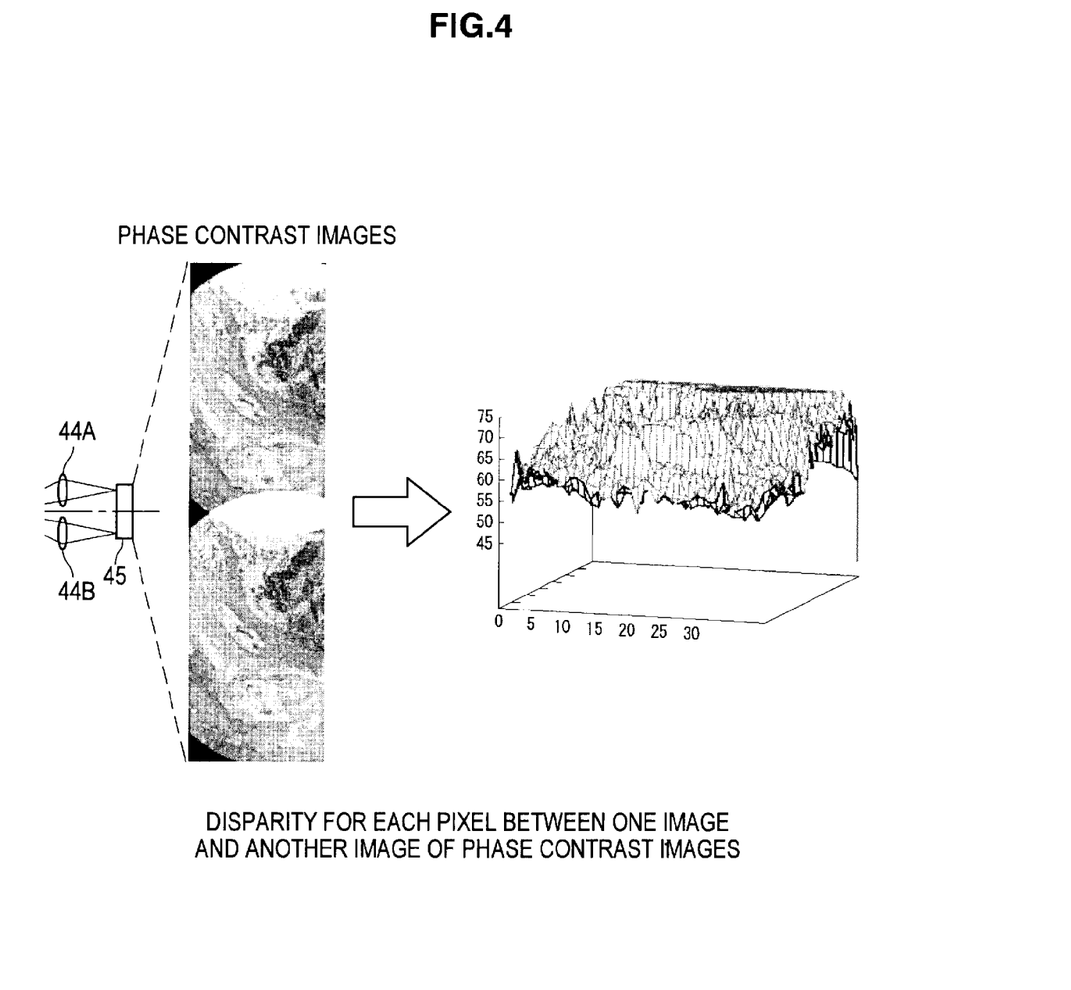
FIG. 4 is a schematic diagram illustrating disparity for each pixel between one image and the other image of the phase contrast images.

Herein, relationship between the position of each pixel of the standard image of the phase contrast images of the tissue section illustrated in FIG. 2 and the distance between the pixel and the relative pixel of the reference image is illustrated in FIG. 4 as a graph. A light portion of the graph in FIG. 4 represents a front side and a dark portion represents a back side. From FIG. 4, it is understood that the irregularity of the tissue section part projected on the image forming surface of the object lens 15 is reflected and an end of a portion of the tissue section part is turned up.

A focusing position determining unit 52 determines a position on which the object lens 15 should be focused (hereinafter, also referred to as a focusing position) based on the position of each pixel of the standard image and the distance between the pixel and the relative pixel of the reference image.

Specifically, a center of gravity of the largest area out of areas in which the pixels with difference (gap) in the distance between the same and the relative pixel smaller than a threshold are adjacent to each other is set as the focusing position. That is to say, a portion with high density and small irregularity in the imaging area (area appearing on the image forming surface of the object lens 15) becomes the focusing position.

The focal position is provided to the stage controller 21 through the integrated controller 30, a moving amount of the focal point of the object lens 15 relative to the focal position (hereinafter, referred to as a defocus amount) is calculated by the stage controller 21, and the stage 11 is moved.

As described above, the depths of field of the separator lenses 44A and 44B are adjusted to be larger than that of the object lens 15. Therefore, the irregularity of the tissue section image formed on the imaging surface of the imaging device 45 (predetermined image forming surface) for determining the imaging condition is represented in more detail than that of the tissue section image formed on the imaging surface of the imaging device 16 (main image forming surface) for imaging.

Therefore, the focusing position determining unit 52 may determine a position at which an entire subject image (tissue section image) appearing on the image forming surface of the object lens 15 becomes sharp as the focusing position in more detail as compared to a case in which the image of the imaging device 16 is used, by using the image of the imaging device 45 (phase contrast images).

Figure 5A:
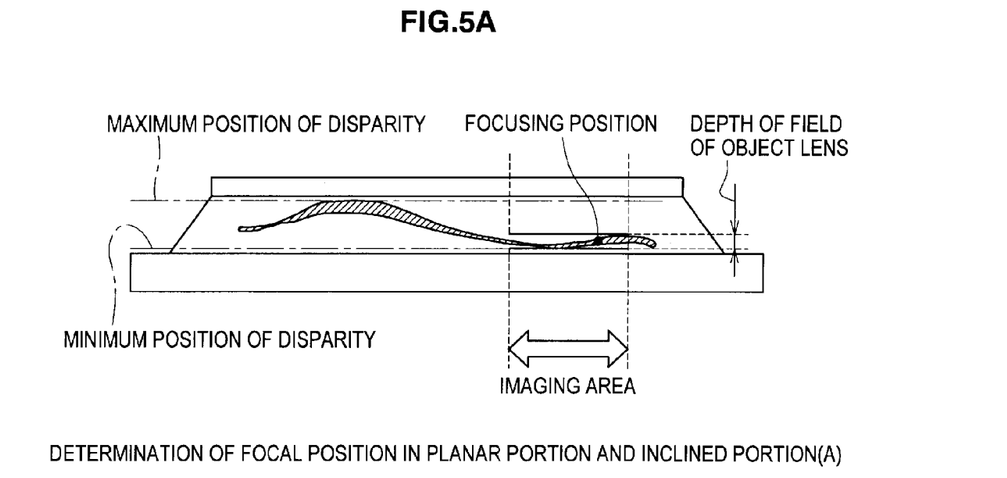
FIG. 5A is a schematic diagram used when illustrating determination of a focal position in a planar portion and in an inclined portion.
Figure 5B:
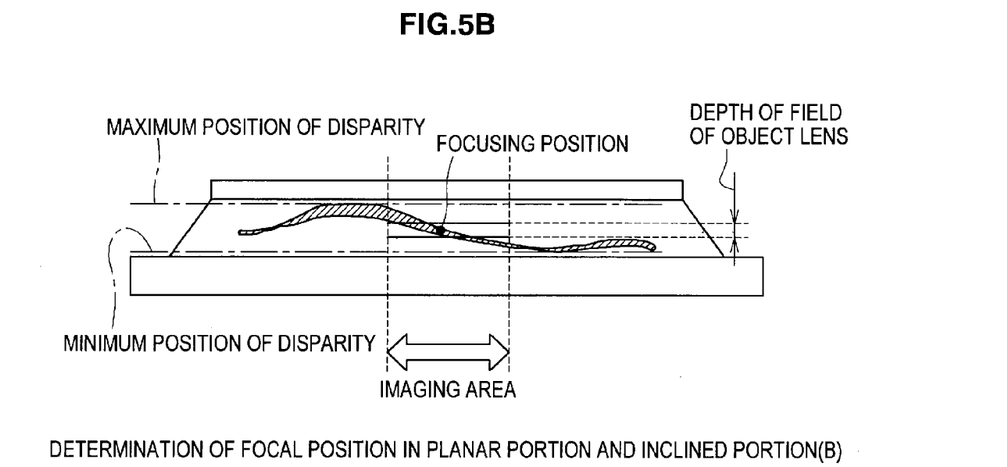
FIG. 5B is a schematic diagram used when illustrating determination of a focal position in a planar portion and in an inclined portion.

However, there is a case in which the tissue section is sealed between the glass slide and the cover glass in a twisted state, as illustrated in FIG. 5, for example. In this case, when the imaging area (area AR appearing on the image forming surface of the object lens 15) is a relatively flat portion (FIG. 5A), the entire subject image of the imaging area (partial image of the tissue section appearing on the image forming surface of the object lens 15) becomes sharp at the focusing position determined by the focusing position determining unit 52.

However, when the imaging area is an inclined portion (FIG. 5B), a width in a depth direction of the subject image in the imaging area (hereinafter, also referred to as an imaging depth) is larger than the depth of field of the object lens 15. Therefore, even when the focal point of the object lens 15 is moved to the focusing position determined by the focusing position determining unit 52, a part of the subject image in the imaging area is lost or defocused.

Figure 6:
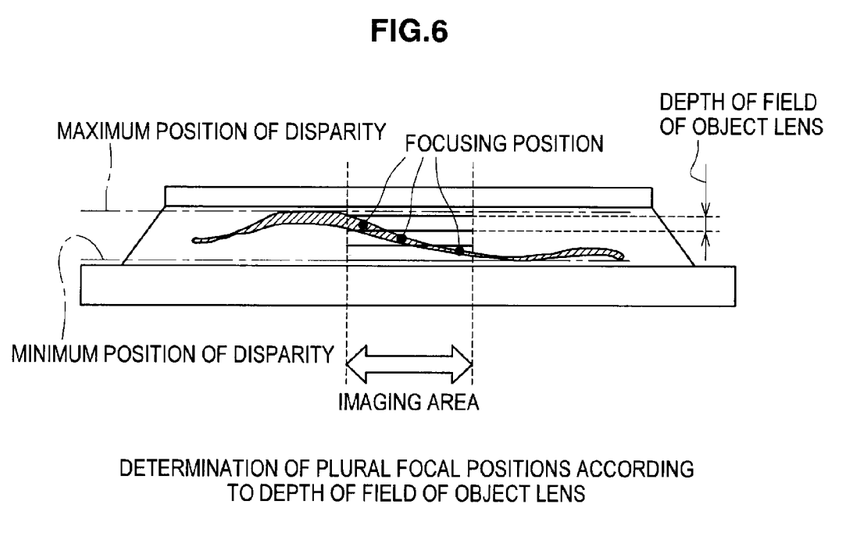
FIG. 6 is a schematic diagram used when illustrating the determination of the focal position according to a depth of field of an object lens.

Therefore, the focusing position determining unit 52 is configured to determine a plurality of focal positions for the imaging area, as illustrated in FIG. 6, when the difference between the maximum value and minimum value in the distance between each pixel of the standard image and the relative pixel of the reference image is larger than the threshold set for the difference.

Specifically, the imaging area is divided into a plurality of layers (hereinafter, also referred to as imaging layers) falling within the depth of field of the object lens 15, and portions with high density and small irregularity in the image layers are determined to be the focusing positions. Meanwhile, a value corresponding to an opening amount (that is to say, the depth of field) set for aperture opening for the object lens 15 and the like is set as the threshold.

[1-3. Focusing Position Determination Procedure]

Next, a focusing position determination procedure in the imaging condition determination processor 46 is described with reference to a flowchart illustrated in FIG. 7.

The imaging condition determination processor 46 starts the focusing position determination procedure when the instruction that the imaging condition should be determined is provided, proceeds to a first step SP1 to obtain the phase contrast images of the subject (tissue section) projected on the image forming surface of the object lens 15 from the imaging device 45, and proceeds to a second step. The imaging condition determination processor 46 obtains the distance (disparity) between each pixel of the standard image and the relative pixel of the reference image from the phase contrast images in the second step SP2 and proceeds to a third step SP3.

The imaging condition determination processor 46 obtains the difference between the maximum value and the minimum value in the distance between each pixel of the standard image and the relative pixel of the reference image in the third step SP3, and proceeds to a fourth step SP4 to compare the difference obtained in the third step SP3 with the threshold.

Herein, when the difference obtained in the third step SP3 is not smaller than the threshold, the imaging condition determination processor 46 judges that the imaging depth of the subject image in the imaging area is larger than the depth of field of the object lens 15 and proceeds to a fifth step SP5. The imaging condition determination processor 46 divides the imaging area into the layers (imaging layers) falling within the depth of field of the object lens 15 in the fifth step SP5 and proceeds to a sixth step SP6.

On the other hand, when the difference obtained in the third step SP3 is smaller than the threshold, the imaging condition determination processor 46 judges that the imaging depth of the subject image in the imaging area is smaller than the depth of field of the object lens 15 and proceeds to the sixth step SP6 without the fifth step SP5.

The imaging condition determination processor 46 determines the portion with the high density and the small irregularity as the focusing position in the imaging area or each of the imaging layers obtained by dividing the imaging area in the sixth step SP6 to finish the focusing position determination procedure.

In this manner, the imaging condition determination processor 46 is configured to determine one or a plurality of focusing positions for the imaging area.

[1-4. Effect and the Like]

In the above configuration, the focusing device 40 forms the phase contrast images on the imaging surface of the imaging device 45 from the openings 43A and 43B having sizes with which the depths of fields of the separate lenses 44A and 44B are larger than that of the object lens 15 by the separator lenses 44A and 44B provided behind the openings 43A and 43B, respectively (refer to FIG. 3).

Figure 7:
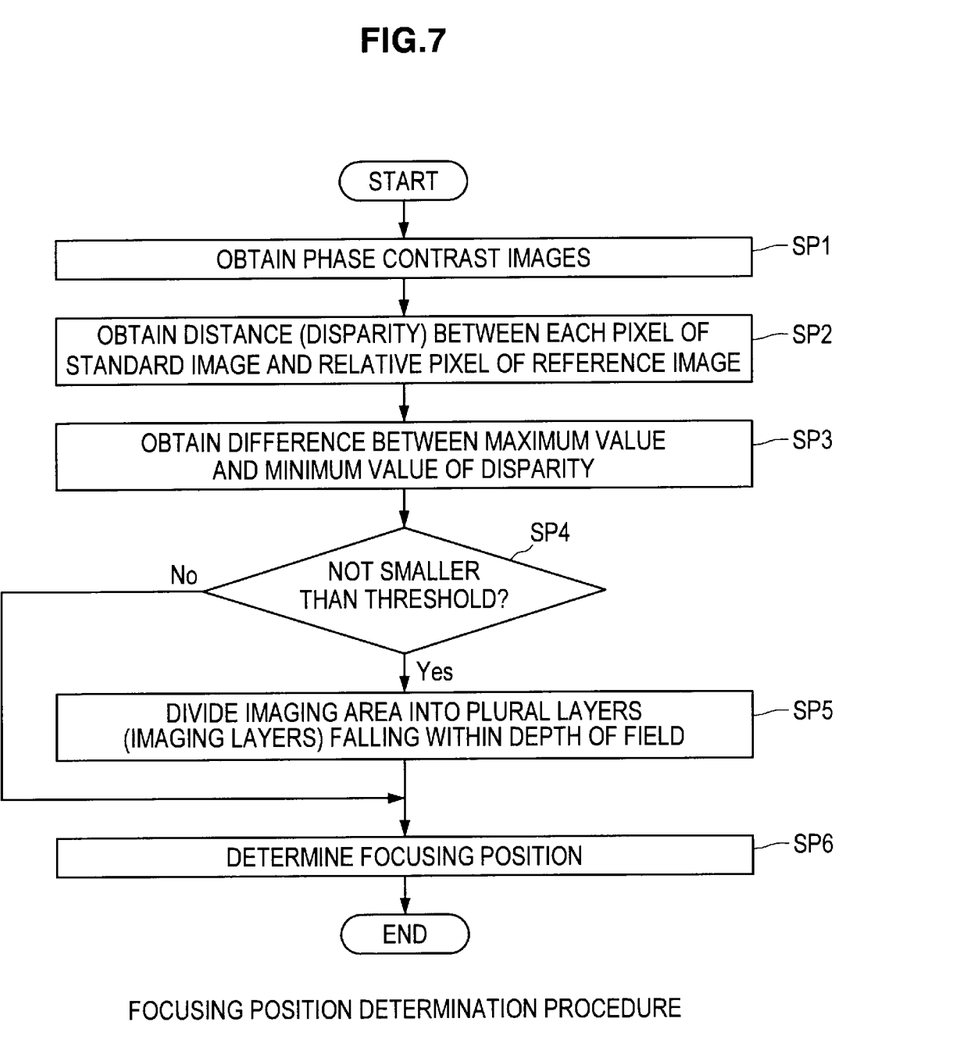
FIG. 7 is a flow chart illustrating a focusing position determination procedure.

Then, the focusing device 40 obtains the distance between the standard image, which is one of the phase contrast images, and the reference image, which is the other of them, in a pixel unit (refer to FIG. 4) and determines the position on which the focus should be adjusted and the number thereof based on the distance of each pixel (refer to FIG. 7).

As described above, the distance between each pixel of the standard image and the relative pixel of the reference image corresponds to the information indicating the irregularity of the imaging area (area appearing on the image forming surface of the object lens 15) AR (FIG. 3). Since the depths of field of the separator lenses 44A and 44B are set to be larger than that of the object lens 15 by the openings in the focusing device 40, the detailed irregularity of the subject may be recognized before focusing from the phase contrast images. Furthermore, the detailed irregularity of the subject may be recognized by one imaging.

Therefore, in the focusing device 40, the focusing position at which the entire subject appearing on the image forming surface the object lens 15 becomes sharp and the number thereof may be appropriately determined in consideration of the irregularity of the subject and the area corresponding to the depth of field of the object lens 15.

As a result, the focal position may be determined at high speed and without loss according to the subject in the imaging area as compared to a method of imaging while shifting the focal point at predetermined intervals in the depth direction of the tissue section and searching the focal position based on contrast of the imaged image.

Since a fluorescent period of the fluorescent marker is limited to a certain period in the dark field mode, the fact that the focal position may be determined at high speed and without loss according to the subject in the imaging area is especially useful in a viewpoint of improving efficiency of obtaining the tissue section image.

According to the above configuration, it becomes possible to determine the focusing position at high speed and without loss according to the subject in the imaging area, thereby realizing the focusing device 40 capable of improving the efficiency of obtaining the tissue section image.

2. Another Example Embodiment

The tissue section is used as the biological sample in the above embodiment. However, the biological sample is not limited to this embodiment. A cell, a chromosome and the like may be used as the biological sample, for example.

The two separator lenses 44A and 44B are used in the above embodiment. However, the number of the separator lenses 44 is not limited to this embodiment. A plurality of separator lenses 44 may be used by making a pair of separator lenses 44A and 44B a unit (group). In this example, it is necessary that the openings corresponding to the separator lenses 44 of each group are provided on the aperture mask 43.

The center of gravity of the largest area out of the areas in which the pixels with the difference (gap) in the distance from the relative pixel smaller than the threshold are adjacent to each other is determined as the position on which the focus should be adjusted in the above embodiment. However, the method of determining the position on which the focus should be adjusted is not limited to this embodiment.

For example, this may be the pixel of an average value of the distance between each pixel of the standard image and the relative pixel of the reference image. When there is a plurality of the pixels, they may be made the centers of gravity. In addition to this, a method of determining the position at which the entire subject image (tissue section image) appearing on the image forming surface of the object lens 15 becomes sharp may be applied.

In the above embodiment, the moving amount of the focal point (defocus amount) of the object lens 15 relative to the focal position is calculated by the stage controller 21 of the microscope 1. However, the focusing position determining unit 52 in the focusing device 40 may be used as a position to calculate the defocus amount in place of this embodiment.

Although the depth of field of the object lens 15 is fixed in the above embodiment, this may be variable. In the case of variable, the process in the above fifth step SP5 may be changed to another process.

Specifically, it is judged whether the difference between the maximum value and the minimum value in the distance (disparity) between each pixel of the standard image and the relative pixel of the reference image is smaller than a value corresponding to the maximum depth of field allowed for the object lens 15 but is not smaller than a value corresponding to the depth of field actually set for the object lens 15.

Figure 8:
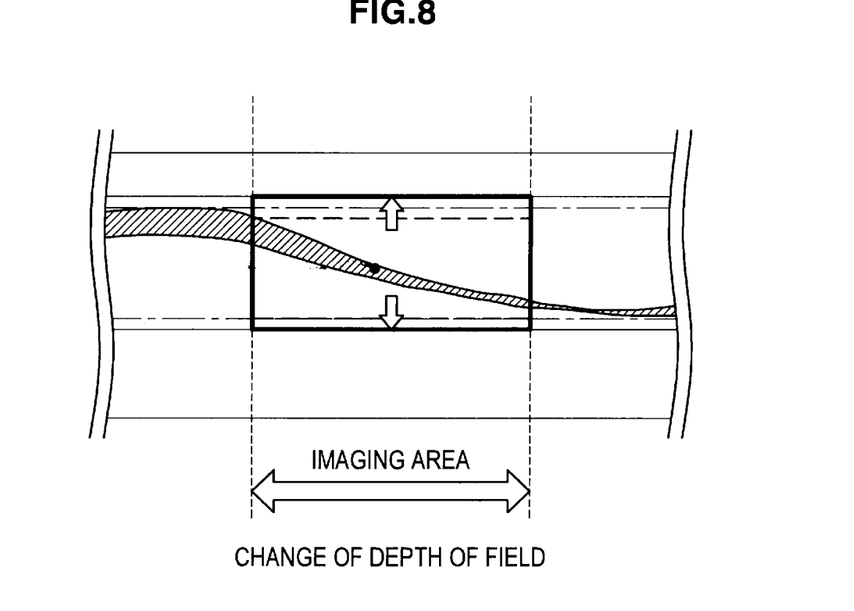
FIG. 8 is a schematic diagram used when illustrating an example of change of the depth of field.

If a positive result is herein obtained, the imaging condition determination processor 46 enlarges the opening of the aperture (not illustrated) for the object lens 15 by a predetermined amount to make the depth of field of the object lens 15 larger, as illustrated in FIG. 8. At that time, the imaging condition determination processor 46 sets exposure time for the imaging device 16 longer according to an enlarged amount and thereafter proceeds to the sixth step SP6. On the other hand, if a negative result is obtained, the procedure proceeds to the sixth step SP6 without enlarging the aperture for the object lens 15.

Meanwhile, a mode in which when the difference between the maximum value and the minimum value in the distance (disparity) between each pixel of the standard image and the relative pixel of the reference image is not smaller than the value corresponding to the maximum depth of field allowed for the object lens 15, the process in the above fifth step SP5 is executed is possible.

In this manner, one or a plurality of focusing positions at which the entire subject image (partial image of the tissue section appearing on the image forming surface of the object lens 15) becomes sharp relative to the imaging area may be determined in further detail.

Figure 9:
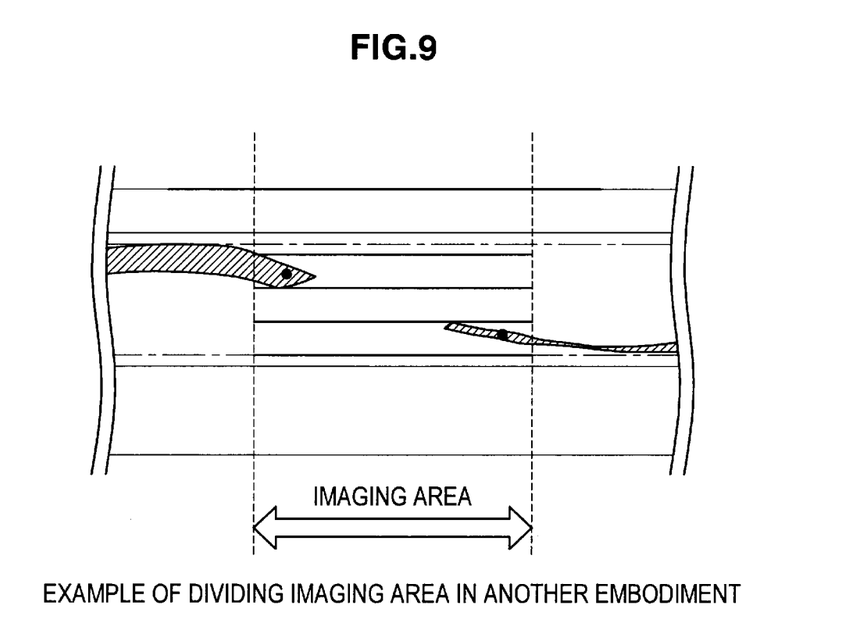
FIG. 9 is a schematic diagram used when illustrating an example of dividing an imaging area in another embodiment.

In the above embodiment, when the difference between the maximum value and the minimum value in the distance (disparity) between each pixel of the standard image and the relative pixel of the reference image is not smaller than the threshold, the imaging area is divided into the layers (imaging layers) falling within the depth of field of the object lens 15. However, a dividing mode is not limited to this embodiment. For example, as illustrated in FIG. 9, the imaging area other than of the tissue section a portion broken in the depth direction may be divided into the imaging layers. In this manner, the process to image while focusing on the broken portion is eliminated, so that it becomes possible to further improve the efficiency of obtaining the subject image.

Although the phase contrast images are formed by the separator lenses 44A and 44B in the above embodiment, the forming method is not necessarily limited to this embodiment and another known one may be adopted.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A focusing device comprising:
a processor; and
a memory device operatively coupled to the processor, the memory device storing instructions that cause the processor, in cooperation with the memory device, to:
(a) generate a first image associated with a sample and a second image associated with the sample;
(b) determine disparities between: (i) the second image associated with the sample; and (ii) a third image associated with the sample; and
(c) for a lens, determine a focusing position based on the determined disparities, wherein the lens:
(i) has a first depth of field which corresponds to a maximum depth of field, wherein a first value corresponds to the first depth of field; and
(ii) is set at a second depth of field, wherein a second value corresponds to the second depth of field,
wherein the instructions, when executed by the processor, cause the processor to:
(i) determine a third value which corresponds to a difference between a first value of disparity and a second value of disparity; and
(ii) in response to the third value being: (A) smaller than the first value; and (B) larger than the second value, set the lens at a third depth of field, the third depth of field being larger than the second depth of field, and
wherein the instructions, when executed by the processor, cause the processor to, in response to the third value being larger than a predetermined threshold, for the lens, divide an imaging area into a plurality of layers, the number of layers being based on the first depth of field of the lens.

2. The focusing device of claim 1, wherein the instructions, when executed by the processor, cause the processor to:
(a) for each of the layers, determine a separate focusing position.

3. The focusing device of claim 1, wherein the layers include a first layer, a second layer and a third layer, and wherein the instructions, when executed by the processor, cause the processor to:
(a) for each of the first layer and the second layer, determine a separate focusing position; and
(b) for the third layer, eliminate a determination of a focusing position.

4. The focusing device of claim 3, wherein the third layer corresponds to a portion which does not include a section of the sample.

5. The focusing device of claim 1, wherein the instructions, when executed by the processor, cause the processor to determine the focusing position based on an area of the generated first image, the area being associated with adjacent pixels having disparities smaller than a threshold value.

6. A method of operating a focusing device including instructions, the method comprising:
(a) causing a processor to execute the instructions to generate a first image associated with a sample and a second image associated with the sample;
(b) causing the processor to execute the instructions to determine disparities between: (i) the second image associated with the sample; and (ii) a third image associated with the sample;

(c) causing the processor to execute the instructions to for a lens, determine a focusing position based on the determined disparities, wherein the lens has a first depth of field which corresponds to a maximum depth of field, wherein a first value corresponds to the first depth of field, and the lens is set at a second depth of field, wherein a second value corresponds to the second depth of field;

(d) causing the processor to execute the instructions to determine a third value which corresponds to a difference between a first value of disparity and a second value of disparity;

(e) causing the processor to execute the instructions to, in response to the third value being: (A) smaller than the first value; and (B) larger than the second value, set the lens at a third depth of field, the third depth of field being larger than the second depth of field; and cause the processor to, in response to the third value being larger than a predetermined threshold, for the lens, divide an imaging area into a plurality of layers, the number of layers being based on the first depth of field of the lens.

7. The method of claim 6, which includes:
(a) causing the processor to execute the instructions to, for each of the layers, determine a separate focusing position.

8. The method of claim 6, wherein the plurality of layers include a first layer, a second layer and a third layer, the method further comprising:
(a) causing the processor to execute the instructions to, for each of the first layer and the second layer, determine a separate focusing position; and
(b) causing the processor to execute the instructions to, for the third layer, eliminate determining a focusing position.

9. The method of claim 8, wherein the third layer includes a portion which does not include a section of the sample.

10. A microscope comprising:
a stage configured to support a sample having a first irregularity;
a lens configured to form a first image associated with the sample;
a processor; and
a memory device operatively coupled to the processor, the memory device storing instructions that cause the processor, in cooperation with the stage, the lens and the memory device, to:
(a) generate a second image associated with the sample;
(b) determine a second irregularity based on the generated second image, the determined irregularity corresponding to the first irregularity; and
(c) for a lens, determine a focusing position based on the determined second irregularity,
wherein the instructions, when executed by the processor, cause the processor to determine disparities between images associated with the sample, the images associated with the sample being different from the first image and the second image, the disparities corresponding to the determined second irregularity, and
wherein the lens:
(i) has a first depth of field which corresponds to a maximum depth of field, wherein a first value corresponds to the first depth of field; and (ii) is set at a second depth of field, wherein a second value corresponds to the second depth of field,
wherein the instructions, when executed by the processor, cause the processor to:
(i) determine a third value which corresponds to a difference between a first value of disparity and a second value of disparity; and
(ii) in response to the third value being: (A) smaller than the first value; and (B) larger than the second value, set the lens at a third depth of field, the third depth of field being larger than the second depth of field, and
wherein the instructions, when executed by the processor, cause the processor to, in response to the third value being larger than a predetermined threshold, for the lens, divide an imaging area into a plurality of layers, the number of layers being based on the first depth of field of the lens.

11. The microscope of claim 10, wherein the sample includes a section of biological tissue.

12. The microscope of claim 10, wherein, at the determined focusing position, the formed image associated with the sample becomes sharp.

13. The microscope of claim 10, which includes a stage driving mechanism configured to drive the stage based on the determined focusing position.

14. The microscope of claim 10, which includes an imaging device operatively coupled to the processor, the imaging device being configured to obtain the first image associated with sample.

15. The microscope of claim 10, which includes:
(a) a first separator lens having a first depth;
(b) a second separator lens having a second depth; and
(c) an aperture mask having a first opening and a second opening.

16. The microscope of claim 10, wherein the instructions, when executed by the processor, cause the processor to adjust the size of a first opening and a second opening such that a first depth of a first separator lens and a second depth of a second separator lens are larger than a depth of a lens configured to form the image associated with a biological sample.

17. The microscope of claim 10, wherein the instructions, when executed by the processor, cause the processor to determine positions of the sample, the positions corresponding to the determined second irregularity.

18. The microscope of claim 10, wherein the instructions, when executed by the processor, cause the processor to:
(a) for each of the layers, determine a separate focusing position.

19. The microscope of claim 10, wherein the layers include a first layer, a second layer and a third layer, and wherein the instructions, when executed by the processor, cause the processor to:
(a) for each of the first layer and the second layer, determine a separate focusing position; and
(b) for the third layer, eliminate determining a focusing position.

20. The microscope of claim 19, wherein the third layer includes a portion which does not include a section of the sample.

* * * * *